United States Patent
Jones et al.

(10) Patent No.: US 7,599,281 B1
(45) Date of Patent: Oct. 6, 2009

(54) LOW RATE MIMO

(75) Inventors: Vincent K. Jones, Redwood City, CA (US); Didier Johannes Richard van Nee, De Meern (NL); Gregory G. Raleigh, Woodside, CA (US)

(73) Assignee: Qualcomm Incorporated, San Diego, CA (US)

( * ) Notice: Subject to any disclaimer, the term of this patent is extended or adjusted under 35 U.S.C. 154(b) by 628 days.

(21) Appl. No.: 11/062,313

(22) Filed: Feb. 17, 2005

Related U.S. Application Data

(60) Provisional application No. 60/545,585, filed on Feb. 17, 2004.

(51) Int. Cl.
*H04J 1/00* (2006.01)
*H04J 11/00* (2006.01)
(52) U.S. Cl. .................. 370/203; 370/208; 370/542
(58) Field of Classification Search .................. 370/203, 370/208, 232, 234, 233, 253, 333, 395.21, 370/329
See application file for complete search history.

(56) References Cited

U.S. PATENT DOCUMENTS

| | | | | |
|---|---|---|---|---|
| 6,134,696 | A | * | 10/2000 | Morelos-Zaragoza et al. .................. 714/790 |
| 6,952,454 | B1 | * | 10/2005 | Jalali et al. .................. 375/260 |
| 2004/0082356 | A1 | * | 4/2004 | Walton et al. ............... 455/522 |
| 2005/0185575 | A1 | * | 8/2005 | Hansen et al. ............... 370/208 |
| 2006/0187815 | A1 | * | 8/2006 | Wallace et al. ............... 370/203 |
| 2007/0064589 | A1 | * | 3/2007 | Fruhauf et al. ............... 370/208 |

* cited by examiner

*Primary Examiner*—Min Jung
(74) *Attorney, Agent, or Firm*—Turocy & Watson, LLP

(57) ABSTRACT

Data to be transmitted via a MIMO communication system having NT transmission paths is divided into M multiple streams and each stream is transmitted from one of the transmission paths of the MIMO system at a rate that is smaller than the rate the transmission path is capable of transmitting. The MIMO communication system is typically adapted to operate in conformity with a known standard, such as IEEE 802.11, and thus has electrical properties conforming to such standards. For example, if the communication system includes two transmission paths each adapted to transfer data at the rate of 48 Mbps per channel, the communication system is operated at a slower bit rate of, for example, 18 Mbps per channel to attain a range that is longer than that of a single spatial transmitter having an equivalent data rate of 36 Mbps.

12 Claims, 4 Drawing Sheets

LOW RATE MIMO

CROSS-REFERENCES TO RELATED APPLICATIONS

The present application claims benefit under 35 USC 119(e) of U.S. provisional Application No. 60/545,585, filed on Feb. 17, 2004, entitled "Low Rate MIMO" the entire content of which is incorporated herein by reference.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

Demand for wireless digital communication and data processing systems is on the rise. Inherent in most digital communication channels are errors introduced when transferring frames, packets or cells containing data. Such errors are often caused by electrical interference or thermal noise. Data transmission error rates depend, in part, on the medium which carries the data. Typical bit error rates for copper based data transmission systems are in the order of $10^{-6}$. Optical fibers have typical bit error rates of $10^{-9}$ or less. Wireless transmission systems, on the other hand, may have error rates of $10^{-3}$ or higher. The relatively high bit error rates of wireless transmission systems pose certain difficulties in encoding and decoding of data transmitted via such systems. Partly because of its mathematical tractability and partly because of its application to a broad class of physical communication channels, the additive white Gaussian noise (AWGN) model is often used to characterize the noise in most communication channels.

Data is often encoded at the transmitter, in a controlled manner, to include redundancy. The redundancy is subsequently used by the receiver to overcome the noise and interference introduced in the data while being transmitted through the channel. For example, the transmitter might encode k bits with n bits where n is greater than k, according to some coding scheme. The amount of redundancy introduced by the encoding of the data is determined by the ratio n/k, the inverse of which is referred to as the code rate.

To gain bandwidth efficiency and coding, Trellis Coded Modulation (TCM) has been developed and combines a multilevel phase modulation signaling set with a trellis coding scheme. TCM increases the minimum Euclidean distance between pairs of coded signals to reduce the loss from the expansion of signal set and to achieve coding gain with relatively simple codes. Another known technique used to code data is convolutional coding such as the ½ rate convolutional code defined by the 802.11a standard.

At the receiving end of a transmission channel, the coded symbols must be decoded. The Viterbi algorithm is an efficient maximum-likelihood sequence detection method for decoding convolutional and trellis coded symbols transmitted over AWGN channels. In accordance with the Viterbi algorithm, for each received signal, a distance between that signal at time $t_i$ and all the trellis paths entering each state at time $t_i$ is calculated. In the Viterbi algorithm, the minimum Euclidean distance is selected as the optimum branch metric for decoding convolutional and trellis sequences transmitted in AWGN channels.

In a multiple-input multiple-output (MIMO) system, the transmitter includes multiple transmit antennas and the receiver includes multiple receive antennas. A MIMO system is typically used to increase the data rate, diversity, or a combination thereof. The increase in data rate is achieved by transmitting multiple data streams via the multiple transmit antennas, also known as spatial multiplexing. The diversity is achieved by increasing the redundancy between the transmit antennas through joint coding.

BRIEF SUMMARY OF THE INVENTION

In accordance with the present invention, a MIMO communication system having NT transmit antennas (transmission paths) is used to increase the transmission range or increase the reliability. Accordingly, the data to be transmitted is divided into multiple streams and each stream is transmitted from one of the transmission paths of the MIMO system at a rate that is smaller than the rate that each transmission path (hereinafter alternatively referred to as path) of the MIMO system can transmit data, as described further below.

The MIMO communication system is typically adapted to operate in conformity with a known standard and thus has electrical properties conforming to such standards. One such standard is IEEE 802.11 standard which has many derivatives. For example, IEEE 802.11a and 802.11g require, among other things, that the data rate vary from a minimum of 6 Mega bits per second (Mbps) to 54 Mbps. Assume that the MIMO communication system includes two transmission paths and is capable of transmitting data at relatively high data rates (e.g., 96 Mbps). Assume further that in one application, the standard calls for the data rate of 36 Mbps, which is lower than the 96 Mbps the MIMO system can transfer data. In accordance with the present invention, the data to be transferred at the rate of 36 Mbps is divided into two streams each transmitted at the rate of 18 Mbps from one of the transmit antennas of such a MIMO system. Consequently, the range achieved by the MIMO system, is greater than the range of a single stream system operating at 36 Mbps. In other words, at any given data rate, the MIMO system is used to achieve a greater range than the range provided by a single-stream transmitting system.

Because in accordance with the method described above, data is transmitted from each path of the communication system at a rate that is smaller than the rate the communication system can transfer data, the communication system suffers less from multi-path and fading effects and thus has an improved inter-symbol interference. For example, in accordance with the present invention, a three-path MIMO system with each channel transferring data at the rate of, for example, 12 Mbps, has a higher range that an 802.11a 36 Mbps single antenna system. As described above, each path of the MIMO system is capable of transferring data at rates higher than 12 Mbps, as defined by a standard. Furthermore, multiple spatial data stream transmission, in accordance with the present invention, may be used to extend the range of standardized communication protocols such as 802.11b, 802.11a, 802.15, CDMA2000, etc., that are designed specifically for single spatial data stream transmission.

Standard encoders typically encode data at a rate that is equal or greater than ½. In accordance with one aspect of the present invention, data is encoded at rates lower than ½. For example, to achieve an encode rate of ¼, two ½ encodes are cascaded to provide an encoding of ¼. More encoding stages may be cascaded to achieve lower encoding rates. For example, two ½ encoder and one ⅔ encoder may be cascaded to achieve an encoding rate of $$1/6\left(\frac{1}{2} \times \frac{1}{2} \times \frac{2}{3} = \frac{1}{6}\right).$$

In accordance with another embodiment, repetition modulation is carried out to achieve low encoding rate. In accordance with the repetition modulation technique, the number of constellation symbols (tones) for each transmit channel is transmitted as many times as is required so as to satisfy predefined conditions.

DETAILED DESCRIPTION OF THE INVENTION

In accordance with the present invention, a MIMO communication system having NT transmit antennas (i.e., NT transmission paths or paths) is used to increase the transmission range. Accordingly, the data to be transmitted is divided into multiple streams and each stream is transmitted from one, or a combination of the transmission paths of the MIMO system at a rate that is smaller than the rate that each transmission path (hereinafter alternatively referred to as path) of the MIMO system can transmit data, as described further below.

Figure 1:
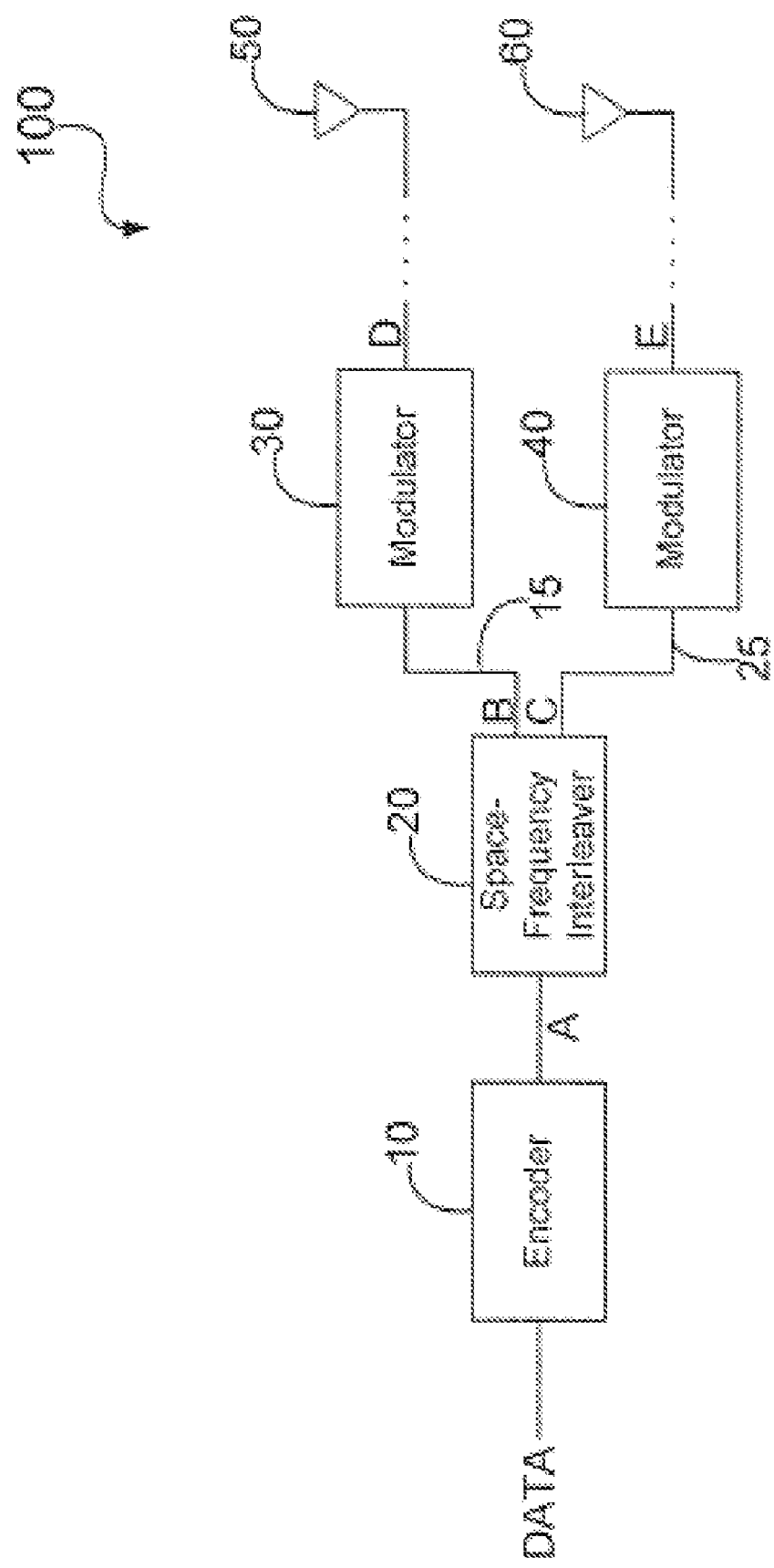
FIG. 1 is a simplified block diagram of the transmission channels of a MIMO system adapted to be used in accordance with the present invention to transmit data.

FIG. 1 is a simplified block diagram of a wireless transmission system 100 adapted to be used in accordance with the present invention to transmit data. Wireless transmission system is shown as including, in part, an encoder 10, a space-frequency interleaver 20, modulators 30, 40, and transmit antennas 50, 60. Modulator 30 and transmit antenna 50 are disposed in the first transmission path 15, and modulator 40 and transmit antenna 60 are disposed in the second transmission path 25. Although the exemplary embodiment 100 of the wireless transmission system is shown as including only two transmission paths, it is understood that the wireless transmission system may include more than two transmission paths. The data transmitted by the transmit antennas 50, 60 are received by multiple, for example, 2, receive antennas of a wireless receive system (not shown). The wireless transmission system together with the wireless receive system form a multiple-input multiple-output system, commonly referred to as a MIMO system.

Encoder 10 is adapted to encode the data that it receives at a predefined rate and supply the encoded data to space-frequency interleaver 20. If the encode rate is, for example, ½, each k bits of the incoming data is encoded with 2 k bits, thereby providing a data redundancy of 2. Accordingly, if incoming data is received at the rate of, for example, 12 Mbps, and the encode rate is ½, the encoded data A supplied to interleaver 20 has the rate of 24 Mbps.

Interleaver 20 receives and interleaves the encoded data. Because wireless transmission system (hereinafter alternatively referred to as transmission system) 100 includes two transmission paths, interleaver 20 divides the interleaved data A into two streams B and C that are delivered to transmission paths 15, 25. Each transmission path is alternatively referred to hereinbelow as a channel.

As shown in FIG. 1, data streams B and C are respectively modulated by modulators 30 and 40, thereby generating modulated data streams D and E. Modulators 30 and 40 may modulate data in accordance with any one of the known modulation techniques, such as, binary phase shift keying BPSK, QPSK, or QAM modulation technique. Modulated data D may further be processed by additional blocks such as, Orthogonal Frequency Division Multiplexing (OFDM) block (not shown), analog/digital filtering block (not shown), analog frequency conversion or modulation (not shown), etc., before it is transmitted by transmit antenna 50. Similarly modulated data E may further be processed by similar additional blocks such as OFDM (not shown) and analog/digital filtering block (not shown), analog frequency conversion or modulation (not shown) etc., before it is transmitted by transmit antenna 60. The data transmitted by transmit antennas 50 and 60 are received by the multiple receive antennas of the receive communication system (not shown). In the exemplary embodiment 100, the number of data streams into which the encoded data is divided, is the same as the number of transmit antennas. It is understood, however, that the number of transmit antennas NT, may be greater than the number of data streams M. Any one of known techniques, such as, space-time-block-coding (STBC), or transmit beam-forming may be used to transmit M streams via NT antennas, where NT is greater than M. Accordingly, any one of these techniques may be applied to the two streams D and E (FIG. 1) or to the streams F and G supplied by OFDM blocks 110, 116 (FIG. 4), described below, to transmit these streams via more than two transmit antennas.

Communication system 100 is typically adapted to operate in conformity with a known standard and thus has electrical properties conforming to such standards. One such standard is IEEE 802.11 standard which has many derivatives. For example, IEEE 802.11a and 802.11g require, among other things, that the data rate vary from a minimum of 6 Mbps to 54 Mbps. Assume that the communication system 100 includes two transmission paths and is capable of transmitting data at relatively high data rates (e.g., 96 Mbps). Assume further that in one application, the standard calls for the data rate of 36 Mbps, which is lower than the 96 Mbps that communication system 100 can transfer data at. In accordance with one exemplary embodiment of the present invention, the data to be transferred at the rate of 36 Mbps is divided into two streams each transmitted at the rate of 18 Mbps from a different one of the two transmit antennas of communication system 100. Consequently, by dividing the data into two streams and transmitting each stream at the rate of 18 Mbps from a different one of the two antennas of communication system 100 (i.e., M=2, NT=2) a transmission range is attained that is longer than the transmission range attained by transmitting the same data as one stream using a single transmit antenna (i.e. M=1, NT=1) or a pair of transmit antennas (i.e., M=1, NT=2). Therefore, given the same data rate, communication system 100 is used in accordance with the present invention to achieve a range greater than the range provided by a single-stream transmitting system Because in accordance with the method described above, data is transmitted from each path of the communication system at a rate that is smaller than the relatively higher rates defined by the standard and with which the communication system is conforming, the communication system suffers less from multi-path and fading effects and thus has an improved inter-symbol interference. Therefore, in accordance with the present invention, communication system 100 is used to achieve a longer range and not to increase the data rate.

The range extension of current data rates as defined by standards, such as 802.11, using MIMO systems in accordance with the method described above, is further illustrated by the following example. A three-path MIMO system with each path transferring data at the rate of 12 Mbps has a higher range that an 802.11a 36 Mbps single spatial stream transmission system. As described above, each path of the MIMO system is capable of transferring data at rates that are higher than 12 Mbps. Furthermore, multiple spatial data stream transmission, in accordance with the present invention, may be used to extend the range of standardized communication protocols such as 802.11b, 802.11a, 802.15, CDMA2000, etc., that are designed specifically for single spatial data stream transmission.

Figure 2:
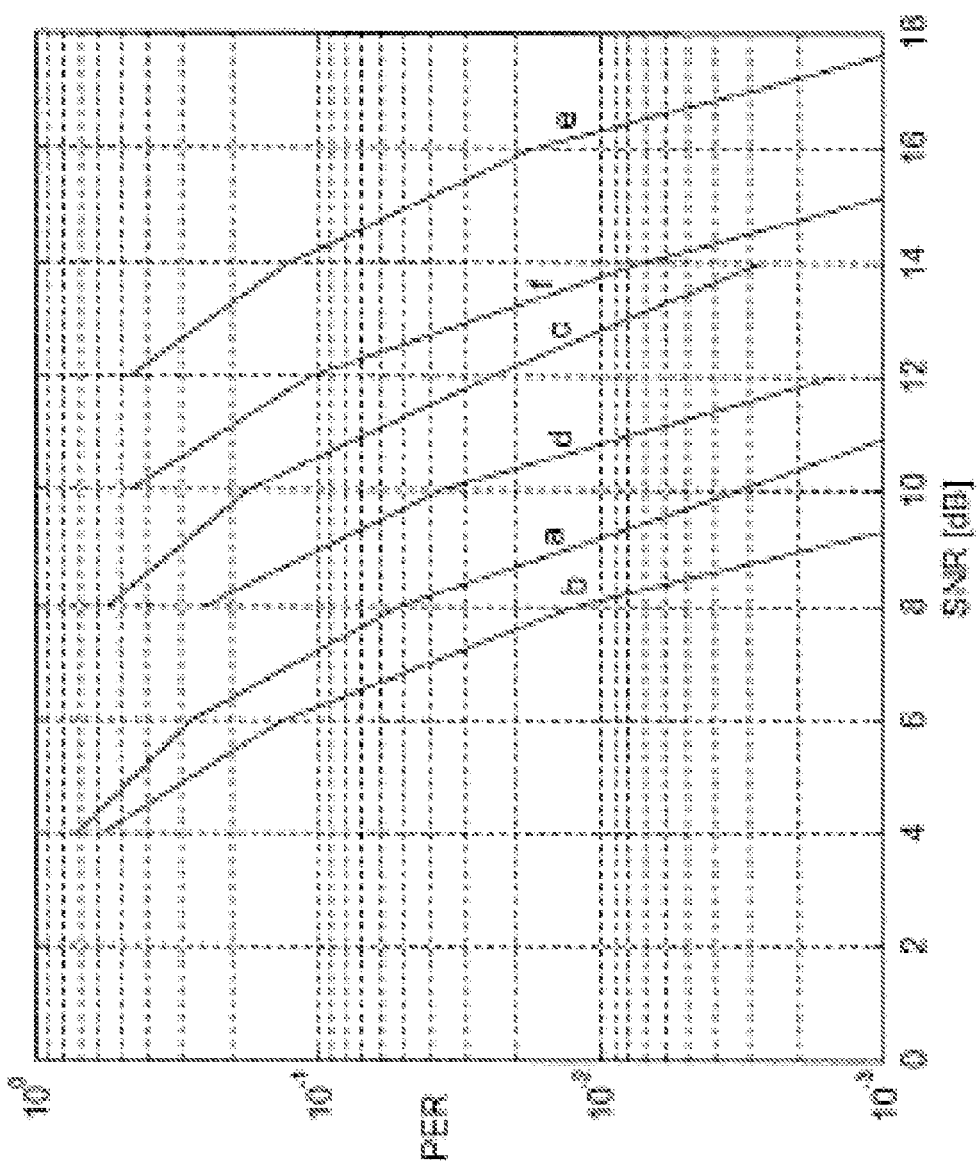
FIG. 2 shows plots of packet error rate (PER) vs. signal to noise ration (SNR) associated with single-spatial mode as well as dual-spatial mode transmissions.

FIG. 2 shows plots of packet error rate (PER) vs. signal to noise ration (SNR) associated with single-spatial mode as well as dual-spatial mode. Accordingly, the same number of receive antennas are used at each data rate for both single-spatial mode as well as dual-spatial mode. However, in single spatial-mode systems, both transmit antennas were used to transmit the same stream (diversity only), whereas in dual spatial-mode systems, each transmit antenna transmits a different data stream. Plot A corresponds to a single-stream (M=1) 24 Mbps system with 2 transmit (NT=2) and 2 receive antennas (NR=2) and is compared to associated plot B that corresponds to a 24 Mbps MIMO system having 2 streams (M=2), 2 transmit antennas (NT=2) and 2 receive antennas (NR=2). Plot C corresponds to a 36 Mbps system with the following characteristics (M=1, NT=2, NR=2) and is compared to associated plot D that corresponds to a 36 Mbps MIMO system with the following characteristics (M=2, NT=2, NR=2). Plot E corresponds to a 48 Mbps system with the following characteristics (M=1, NT=2, NR=2) and is compared to associated plot F that corresponds to a 48 Mbps MIMO system with the following characteristics (M=2, NT=2, NR=2). To generate these plots, the following were used: 100-byte packets, 802.11a convolutional coding, 50 ns delay spread, independent Rayleigh fading channels for all transmit and receive paths, together with all training symbols.

As seen from FIG. 2, for each pair of associated plots and at each level of SNR, the communication system with (M=2, NT=2, NR=2) has a smaller PER than the communication system with (M=1, NT=2, NR=2). For example, at SNR of 8 dB, 24 Mbps communication system with (M=2, NT=2, NR=2) has a PER of approximately $1.2 \times 10^{-2}$ whereas the 24 Mbps communication system with (M=1, NT=2, NR=2) has a PER $5 \times 10^{-2}$. Therefore, for each data rate, the communication system with (M=2, NT=2, NR=2) achieves a higher range and higher levels of reliability than the communication system with (M=1, NT=2, NR=2).

Column 1 of Table I below provides some examples of existing standardized data rates for 802.11a/g. Column 2 shows the associated coding rate as well as the modulation techniques as defined by the standard for the single spatial-mode (1 TX mode) transmission. Column 3 shows the associated coding rate as well as the modulation techniques for use in transmission by a dual spatial-mode (2 TX mode or M=2) MIMO system, in accordance with the method of the present invention. Column 4 shows the associated coding rate as well as the modulation techniques for use in transmission by a triple spatial-mode (3 TX mode or M=3) MIMO system, in accordance with the method of the present invention.

TABLE I

| Existing Standardized Data Rate | 1 TX Mode | 2 TX Mode | 3 TX Mode |
| --- | --- | --- | --- |
| 48 Mbps | 64 QAM, ⅔ coding | 16 QAM, ½ coding | QPSK, ⅔ coding |
| 36 Mbps | 16 QAM, ¾ coding | QPSK, ¾ coding | QPSK, ½ coding |
| 18 Mbps | QPSK, ¾ coding | BPSK, ¾ coding | BPSK, ½ coding |
| 6 Mbps | BPSK, ½ coding | BPSK, ¼ coding | BPSK, ⅙ coding |

For example, to transfer data at the rate of 48 Mbps, using a 1 TX mode, the existing standard requires data to be coded using a ⅔ encoder and modulated using a 64QAM modulator. To achieve the same transmission rate using a 2 TX mode, data is coded using a ½ encoder and modulated using 16 QAM modulation technique. Similarly, to achieve the same transmission rate using a 3 TX mode, data is coded using a ⅔ encoder and modulated using QPSK modulation technique.

For lower data rates, such as 6 Mbps, using 2TX or 3TX modes, the encode rate is shown to be respectively equal to ¼ or ⅙. Standard encoders typically encode data at a rate that is equal or greater than ½. In accordance with one aspect of the present invention, data is encoded at rates lower than ½, as described further below.

Figure 3:
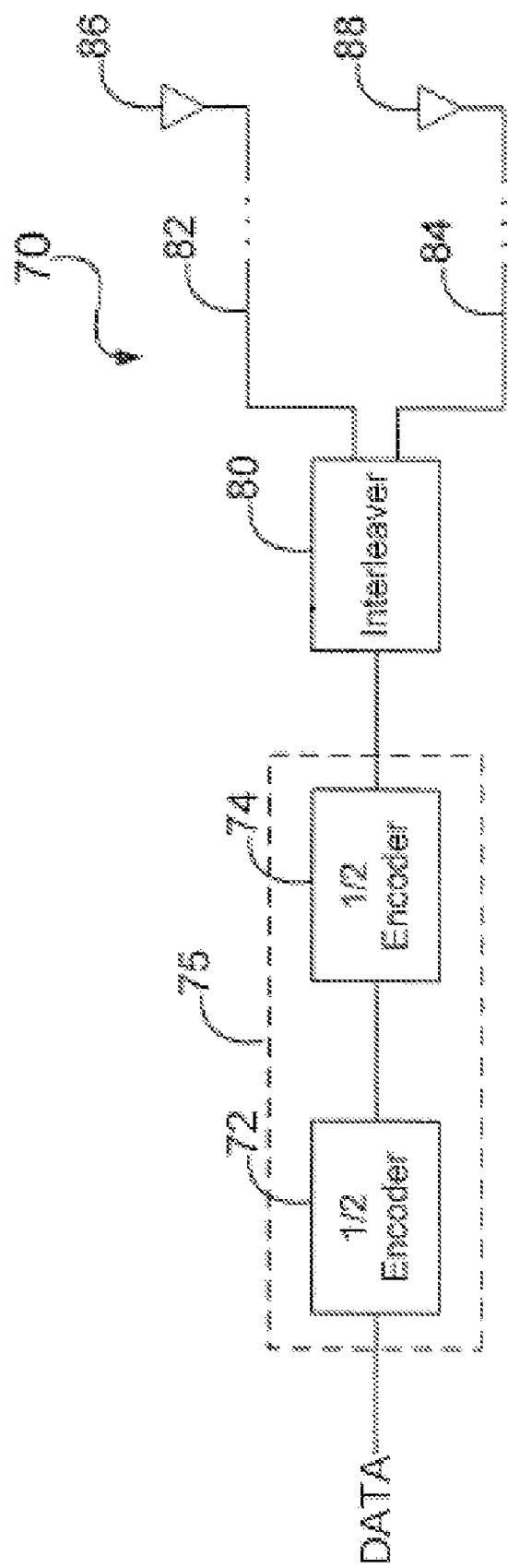
FIG. 3 shows, in part, an encoder of a transmission system adapted to encode data at the rate of less than ½.

FIG. 3 shows an encoder 75 of a 2TX mode MIMO system 70 adapted to encode data at the rate of ¼ so as to transfer data at the rate of 6 Mbps, in accordance with the Table I above. Encoder 75 include a pair of encoders 72 and 74 each of which is a ½ encoder. Accordingly, data supplied to interleaver 80 is encoded at the rate of ¼. It is understood that more encoding stages may be cascaded to achieve lower encoding rates. For example, two ½ encoder and one ⅔ encoders may be cascaded (not shown) to achieve an encoding rate of $$1/6 \left( \frac{1}{2} \times \frac{1}{2} \times \frac{2}{3} = \frac{1}{6} \right).$$

Figure 4:
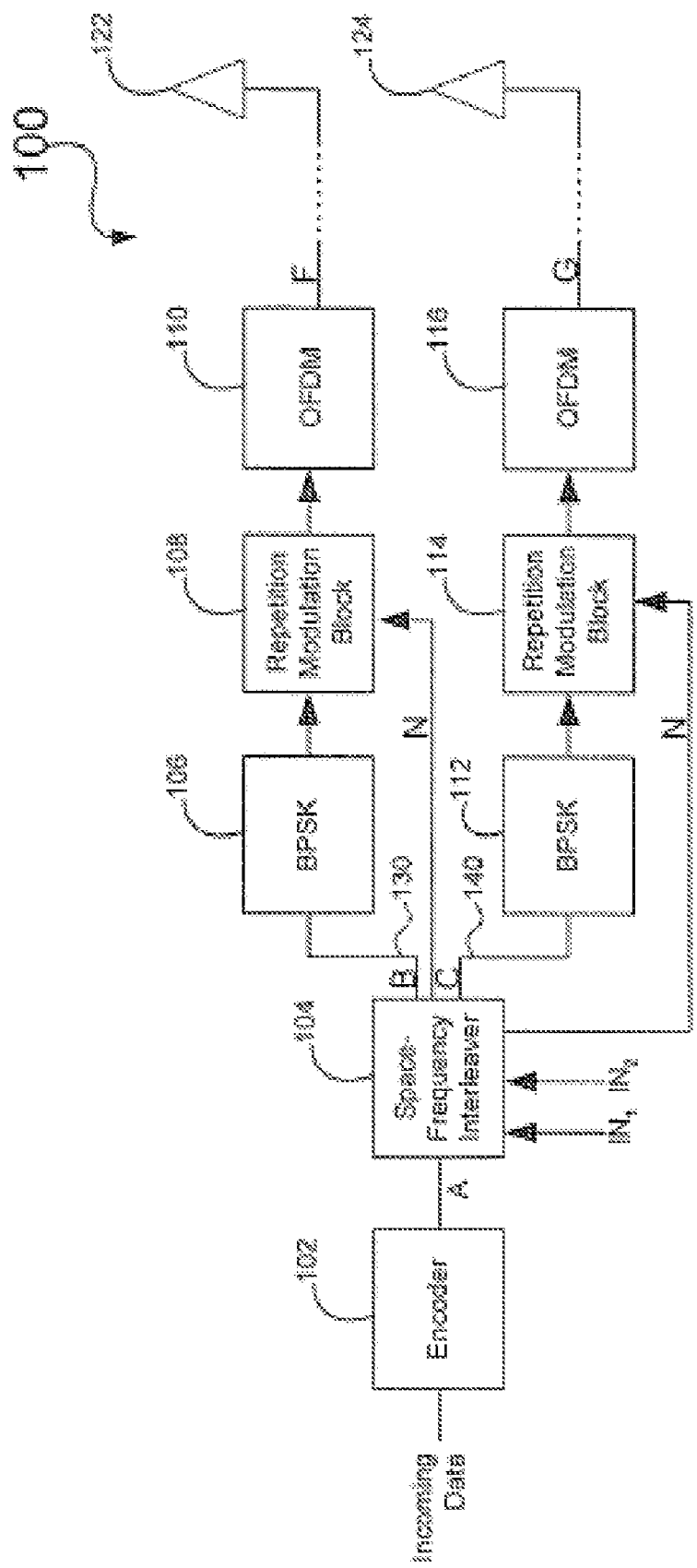
FIG. 4 shows a two-channel transmit end of a MIMO system, adapted to perform repetition modulation, in accordance with one embodiment of the present invention.

FIG. 4 shows a two-channel transmit end 200 of a MIMO system, in accordance with another embodiment, adapted to achieve a low encoding rate using repetition modulation, as described further below. In FIG. 4, it is assumed that transmit end 200 is an OFDM transmit end. However, it is understood that the present invention applies to any other MIMO system, OFDM or otherwise. Assume that the incoming data stream is received at the rate of 6 Mbps. Encoder 102 receives and encodes the incoming data stream using a standard encode rate of, for example, ½ and supplies the 12 Mbps encoded data to space-frequency interleaver 104. Interleaver 104 interleaves and divides the encoded data into two 6 Mbps data streams B and C that are respectively supplied to channels 130, 140. Data stream B is shown as being modulated using BPSK modulator 106, and data stream C is shown as being modulated using BPSK modulator 112. Data modulated by the BPSK modulators 106, 112 are respectively supplied to repetition modulation blocks 108, 114, described further below. The outputs of repetition modulation blocks 108, 114 are respectively applied to OFDM blocks 110, 116. It is understood that each of channels 130, and 140 may include more functional blocks (not shown). Data is transmitted from channels 130, 140 using transmit antenna 122, and 124 respectively.

Interleaver 104 is further configured to receive two input signals $IN_1$ and $IN_2$. Input signal $IN_1$ specifies the number of data streams to which the stream received by interleaver 104 is divided into. For example, if $IN_1$ is equal to 2, the data stream received by interleaver 104 is divided into 2 data streams. Input signal $IN_2$ specifies the number of tones V to be transmitted associated with a single stream, as defined by the standard.

Assume that data is to be transferred at the rate of Q Mbps from each of M paths of a transmitting end. Assume further that the encoder is configured to encode incoming data stream at the rate $$\frac{1}{S}$$

as defined by the standard, B represents the number of bits per symbol B used by the modulators of each channel, and T represents the time period used in transmitting each tone. Accordingly, the number of unique tones U to be transmitted from each path is as follows:

$$U = \frac{Q \times T \times S}{B \times M}$$

A numerical example with reference to exemplary embodiment 200 shown in FIG. 4 is provided below. Assume that Q is 6 Mbps, as defined by the standard. To maintain the coding rate at ½, S is thus set to 2. M is assumed to be equal to 2. Because each modulator is a BPSK modulator, B is also equal to 1. As is known, the standard defines T as being equal to 4 μsec. Accordingly, U is determined to be equal to 24. Assume further that input signal $IN_2$ specifies the number of tones as 48. Because, in accordance with above numerical example, V is specified as being equal to 48 and U is determined as being equal to 24, interleaver 104 determines that modulation repetition parameter N is equal to 2, where N is defined as follows:

$$N = \frac{V}{U}$$

Interleaver 104 supplies parameter N to each of repetition modulation blocks 108, 114. Each repetition modulation block sends each constellation points N times to its associated OFDM block. For example, in accordance with the example above, because V is specified to be equal to 48, each of the unique tones (or unique constellation symbols) is repeated two times and delivered to its associated OFDM block. Accordingly, vectors $X_1$ and $X_2$ supplied respectively to OFDM blocks 110, 116, respectively by repetition modulation blocks 108, 114 are as follows:

$$X_1 = \begin{bmatrix} x_1 \\ x_2 \\ x_3 \\ \cdot \\ \cdot \\ \cdot \\ x_{23} \\ x_{24} \\ x_1 \\ x_2 \\ x_3 \\ \cdot \\ \cdot \\ \cdot \\ x_{23} \\ x_{24} \end{bmatrix} \quad X_2 = \begin{bmatrix} x_{25} \\ x_{26} \\ x_{27} \\ \cdot \\ \cdot \\ \cdot \\ x_{47} \\ x_{48} \\ x_{25} \\ x_{26} \\ x_{27} \\ \cdot \\ \cdot \\ \cdot \\ x_{47} \\ x_{48} \end{bmatrix}$$

Therefore, as seen from above vector $X_1$ includes a set of constellation symbols $x_1 x_2 x_3 \ldots x_{22} x_{23} x_{24}$ that is repeated twice. Similarly, vector $X_2$ includes a set of constellation symbols $x_{25} x_{26} x_{27} \ldots x_{46} x_{47} x_{48}$ that is repeated twice.

OFDM block 110 performs cyclic-extension as well as inverse Fourier transform operation (not shown), as understood by those skilled in the art, on symbol vector $X_1$ to generate associated time sequences that are transmitted by antenna 122. Similarly, OFDM block 110 performs cyclic-extension as well as inverse Fourier transform operation on symbol vector $X_2$ to generate associated time sequences that are transmitted by antenna 124.

In some embodiments, the set of constellation symbols for each of vectors $X_1$ and $X_2$ may be different. Furthermore, within each set, the constellation symbols may be arranged in an arbitrary manner. For example, the first set of constellation symbols for vector $X_1$ may be as follows:

$[x_2 x_1 x_{23} x_9 \ldots x_{17} x_{13} x_5]$ and the second set of constellation symbols for vector $X_1$ may be as follows:

$[x_{22} x_{19} x_2 x_1 \ldots x_8 x_{16} x_{20}]$

Although it is understood that each set includes one occurrence of each of the 24 tones. At the receiving end, the repeated transmission of that symbol (i.e., tones) may be exploited, as is known for example in MIMO receivers which include MMSE or ZF detection blocks. Any other advanced coding scheme may also be used.

For further explanation, assume a MIMO system with three receive channels and two transmit channels. Assume $x_i$ is a 2-dimensional vector of transmitted symbols, $y_i$ is a 3-dimensional vector of received symbols and that $H_i$ is a 3×2 channel matrix. Accordingly, $$y_i = H_i x_i$$

where i is tone index, ranging from 1 to 48.

Since the tones are repeated, the channel may be represented by matrix G which is a 6×2 channel over 24 tones. Therefore:

$$y_j = G_j x_j$$

where j is an index varying from 1 to 24, $y_j$ is a six dimensional vector and $x_j$ is a 2-dimensional vector. Accordingly, the following expression applies:

$$G_j = \begin{bmatrix} H_j \\ H_{j+24} \end{bmatrix}$$

Hence, any MMSE, ML, or ZF algorithm may be used to detect the 24 unique QAM symbols. Since the new channel matrix G has the dimension of 6×2, it has a higher capacity and provides for more reliable detection of symbols.

The above embodiments of the present invention are illustrative and not limiting. Various alternatives and equivalents are possible. The invention is not limited by the type of encoding, decoding, modulation, demodulation, equalization, filtering, etc., performed. The invention is not limited to the number of transmit or receive antennas. The invention is not limited by the rate used to transfer the data. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A method of operating a wireless communication system having electrical characteristics defined by a standard and comprising at least two transmission paths each adapted to transmit data at a rate of P Mega bits per second (Mbps) in conformity with the standard, the method comprising:
    employing a processor executing computer executable instructions embodied on a computer readable storage medium to perform the following acts:
    transmitting a first data stream from a first one of the at least two transmission paths at a rate of Q Mbps, wherein Q is smaller than P;
    transmitting a second data stream from a second one of the at least two transmission paths at the rate of Q Mbps;
    encoding each of the first and second data streams at a rate of $$\frac{1}{S};$$

defining a number U of unique tones to be transmitted from each of NT transmission paths; and
    sending each of the U unique tones N times from each of the NT transmission paths, wherein U is determined in accordance with the following:

$$U = \frac{Q \times T \times S}{B \times M}$$

wherein T represents the time period defined by the standard for transmitting each tone, B represents the number of bits per symbol, M represents the number of streams the data is divided into, and wherein N is determined in accordance with the following:
    wherein V is the number of tones specified by the standard to be transmitted associated with the encoding rate of 1/S, wherein encoding rate of 1/S is also defined by the standard.

2. The method of claim 1 wherein said standard is an IEEE 802.11 standard and wherein said P is selected from a group consisting of 6, 9, 12, 18, 24, 36, 48, and 54 Mbps.

3. The method of claim 1 further comprising:
    receiving the first and second transmitted data streams via at least two receive antennas.

4. The method of claim 1 further comprising:
    appending the first data stream with a first cyclic prefix;
    performing an inverse Fourier transform operation on the appended first data stream;
    appending the second data stream with a second cyclic prefix; and
    performing an inverse Fourier transform operation on the appended second data stream.

5. The method of claim 4 further comprising:
    modulating each of the first and second data streams using one of the BPSK, QPSK, and QAM modulation techniques.

6. The method of claim 1 further comprising:
    modulating each of the first and second data streams using one of the BPSK, QPSK, and QAM modulation techniques.

7. The method of claim 1 further comprising encoding at least one of the first and second data streams using an encoding rate of at ½ or less.

8. The method of claim 1 wherein the tones in each of the unique tones are arranged according to a predefined sequence.

9. The method of claim 1 further comprising:
    encoding the first data stream using a first $$\frac{1}{S}$$

encoder to generate a once encoded first data stream;
    encoding the once encoded data stream using a second $$\frac{1}{S}$$

encoder to generate a twice encoded first data stream;
    encoding the second data stream using a third $$\frac{1}{S}$$

encoder to generate a once encoded second data stream; and
    encoding the once encoded second data stream using a fourth $$\frac{1}{S}$$

encoder to generate a twice encoded data stream.

10. The method of claim 1 further comprising:
    encoding the first data stream using a first $$\frac{1}{S}$$

encoder to generate a once encoded first data stream; and
encoding the once encoded data stream using a second $$\frac{1}{L}$$

encoder to generate a twice encoded first data stream having encoding rate of $$\frac{1}{S \times L},$$

wherein S is a ratio of a first pair of integer numbers and L is a ratio of a second pair of integer numbers.

11. A method of transmitting M streams of data from NT transmission paths of a wireless communication system, wherein each of the NT transmission paths has a rate of Q Mbps, the method comprising:
  employing a processor executing computer executable instructions embodied on a computer readable storage medium to perform the following acts:
  encoding each of M data streams at a rate of $$\frac{1}{S};$$

determining a number U of unique tones to be transmitted from each of NT transmission paths; and
  sending each of the U unique tones a plurality of times from each of the NT transmission paths, wherein U is determined in accordance with the following:

$$U = \frac{Q \times T \times S}{B \times M}$$

wherein T represents the time period for transmitting each tone, and B represents the number of bits per symbol.

12. A wireless communication system comprising:
  an encoder adapted to encode received data at a rate of $$\frac{1}{S},$$

wherein S is a ratio of two integer numbers;
  a frequency interleaver adapted to interleave the encoded data and generate M streams of data each delivered to a different one of M channels of the wireless communication system; said interleaver further adapted to receive an input signal and in response determine a number U of unique tones to be transmitted from each of NT transmission paths of the wireless communication system, wherein U is determined in accordance with the following:

$$U = \frac{Q \times T \times S}{B \times M}$$

wherein T represents the time period for transmitting each symbol, and B represents the number of bits per symbol; and
  NT repetition modulation blocks each disposed in a different transmission path of the wireless communication system and each further adapted to send each symbol N times to an associated OFDM block, wherein N is determined in accordance with U.

\* \* \* \* \*

UNITED STATES PATENT AND TRADEMARK OFFICE
CERTIFICATE OF CORRECTION

PATENT NO. : 7,599,281 B1
APPLICATION NO. : 11/062313
DATED : October 6, 2009
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1223 days.

Signed and Sealed this

Twenty-eighth Day of September, 2010

David J. Kappos
*Director of the United States Patent and Trademark Office*